United States Patent [19]

Schlansker et al.

[11] Patent Number: 5,710,912
[45] Date of Patent: Jan. 20, 1998

[54] METHOD AND APPARATUS FOR ENABLING A COMPUTER SYSTEM TO ADJUST FOR LATENCY ASSUMPTIONS

[75] Inventors: Michael S. Schlansker; B. Ramakrishna Rau; Rajiv Gupta, all of Los Altos, Calif.; Joseph A. Fisher, Brookline, Mass.

[73] Assignee: Hewlett-Packard Co., Palo Alto, Calif.

[21] Appl. No.: 59,041

[22] Filed: May 6, 1993

[51] Int. Cl.$^6$ ............................................. G06F 15/16
[52] U.S. Cl. ...................... 395/561; 395/591; 395/383
[58] Field of Search ............................ 364/736, 200; 395/425, 375, 700, 561, 591, 383

[56] References Cited

U.S. PATENT DOCUMENTS

| | | | |
|---|---|---|---|
| 4,722,050 | 1/1988 | Lee et al. | 364/200 |
| 4,891,753 | 1/1990 | Budde et al. | 364/200 |
| 5,021,985 | 6/1991 | Hu et al. | |
| 5,051,940 | 9/1991 | Vassiliadis et al. | 364/736 |
| 5,193,158 | 3/1993 | Kinney et al. | 395/375 |
| 5,224,210 | 6/1993 | Pinedo et al. | 394/164 |
| 5,278,967 | 1/1994 | Curran | 395/425 |
| 5,283,873 | 2/1994 | Steely, Jr. et al. | 395/375 |
| 5,333,284 | 7/1994 | Nugent | 395/375 |
| 5,420,980 | 5/1995 | Pinedo et al. | 395/164 |

FOREIGN PATENT DOCUMENTS 2 263 565  7/1993  United Kingdom.

OTHER PUBLICATIONS

Katsuno et al., "A 64-bit Floating-Point Processing Unit with a Horizontal Instruction Code for Parallel Operations", 1990, IEEE International Conference on Computer Design: VLSI in Computers and Processors, Sep. 17-19, 1990, pp. 347-350.

Uvieghara et al., "An Experimental Single-Chip Data Flow CPU", IEEE Journal of Solid-State Circuits, vol. 27, No. 1, Jan. 1992, pp. 17-28.

Yoshida et al., "A Strategy for Avoiding Pipeline Interlock Delays in a Microprocessor", 1990 IEEE International Conference on Computer Design: VLSI in Computers and Processors, Sep. 17-19, 1990, pp. 14-19.

Kuehn et al., "The Horizon Supercomputing System; Architecture and Software", IEEE Proceedings on Supercomputing '88, pp.28-34.

Draper, "Compiling on Horizon", IEEE Proceedings on Supercomputing '88, pp. 51-2.

Thistle et al., "A Processor Architecture for Horizon", IEEE Proceedings on Supercomputing '88. pp.35-41.

Rau et al., "The CYDRA 5 Stride-Insensitive Memory System", 1989 International Conference on Parallel Processing, pp. 1244-1246.

*Primary Examiner*—Alvin E. Oberley
*Assistant Examiner*—Majid A. Banankhoh

[57] ABSTRACT

A method and system are disclosed which allow a computer program to execute properly in object code compatible processing systems which have latencies different from those with which the program was created or compiled. This resulting compatibility of the computer program is achieved because the invention protects the precedence of operations within the computer program using latency assumptions which were used when creating the computer program. When the computer program is created, latency assumption information is efficiently provided within the computer program. Thereafter, when the computer program is executed, it is able to advise the processing system of the latency assumptions with which it was created. Various ways are described in which the processing system can utilize the latency assumptions when executing the computer program so as to ensure compatibility.

21 Claims, 8 Drawing Sheets

METHOD AND APPARATUS FOR ENABLING A COMPUTER SYSTEM TO ADJUST FOR LATENCY ASSUMPTIONS

BACKGROUND OF THE INVENTION

1. Field of the Invention

The present invention relates to a method and apparatus for using pipeline latency assumptions to simplify interlock hardware and, more particularly, to a method and apparatus for executing a program in different code compatible processors in accordance with latency assumptions with which the program was coded, regardless of hardware latencies of the code compatible processors.

2. Description of the Related Art

Many efforts have been made to exploit parallelism existing in computer programs. For the most part, these efforts are transparent to the user.

One technique for exploiting parallelism is pipelining. Pipelining implies the partitioning of instructions into computational steps which can be executed independently by computational units called pipeline segments. Although pipelining significantly improves computer performance, a high level of dependency between operations limits the maximum overlap that is achievable.

A processing system which utilizes pipelining to execute traditional sequence-oriented computer programs can process operations at high speed. However, when pipelining is used, special precautions must be taken for situations in which subsequent operations are dependent on the result of earlier operations which have not completed. That is, the special precautions must prevent the issuance of subsequent dependent operations before the results of the earlier operations are obtained.

Conventionally, the special precautions are handled by special hardware known as scoreboard or interlock hardware. The scoreboard or interlock hardware allows the programmer to assume that all operations occur within a single cycle. However, since many operations take more than one cycle, the scoreboard or interlock hardware must detect the dependency of subsequent operations with the result of a previous, incomplete operation. Specifically, if an operation takes more than one cycle to complete and the subsequent operation is dependent upon the previous instruction, then the processing system must function to protect the dependency by stalling the issuance of the subsequent operation until the result of the previous, incomplete operation is obtained.

An example of a known scoreboard or interlock hardware approach for preventing out-of-order execution is illustrated by the M32/100 microprocessor (Mitsubishi Electric Corporation). The M32/100 microprocessor has a five stage instruction execution pipeline and uses a hardware interlock mechanism with scoreboard registers to preserve the precedence of an instruction stream. More particularly, the M32/100 has multiple scoreboard registers which correspond to the pipeline stages. A bit is set in the scoreboard register which corresponds to the resource (register) receiving the result of the current instruction. The bit is shifted to the next stage scoreboard register synchronized with the flow of the instruction in the pipeline. When the execution of the instruction is completed, the bit is shifted out of the scoreboard registers. For example, if an instruction with a memory operand reaches the A-stage of the pipeline and tries to fetch the contents of a register or memory with a set scoreboard bit in at least one scoreboard register, the instruction pipeline stalls. The M32/100 microprocessor is more fully described in Yoshida et al., "A Strategy for Avoiding Pipeline Interlock Delays in a Microprocessor," 1990 IEEE International Conference on Computer Design: VLSI in Computers and Processors, Cambridge, Mass. (1990).

Another example of a known scoreboard or interlock hardware approach for preventing out-of-order execution uses tag and ready bit information with each register entry. The ready bit indicates whether the data in the register entry are valid, while the tag indicates the version of the register. Incorrect execution is prevented because operations whose operands are not ready are sent to a wait area until their operands are ready. As a result, instructions which are not yet ready do not necessarily stall the machine. This approach is more fully described in Uvieghara et al., "An Experimental Single-Chip Data Flow CPU," IEEE Journal of Solid-State Circuits, Vol. 27, No. 1, January 1992.

The special precautions (which prevent the issuance of subsequent dependent operations before the results of the previous, incomplete operations are obtained) can also be designed into the program. Namely, a class of machines exist which have user visible latencies which may coincide with actual hardware latencies. For these machines, programs can be written which guard against premature use of data by inserting a requisite number of operations between an operation and a use of its result. These inserted operations are placed in what is referred to as user visible delay slots. The number of user visible delay slots between an operation and use of its result depends on the latency. A processing system which executes a program having user visible delay slots need not use complex scoreboard or interlock hardware to determine if dependency exists.

User visible delay slots are programmed into code by a programmer or a compiler. The programmer or compiler uses detailed knowledge about resource availability and operation timing of the processing system (e.g., hardware latencies) to schedule the operations, inserting no-operations (NOOPs) when nothing else will work. Examples of user visible delay slots are memory load delay slots, branch delay slots and arithmetic delay slots. A load delay slot, for example, defines a number of cycles subsequent to a load operation during which the processing system cannot assume that the load has been completed.

An advantage of programming with user visible delay slots is that the processing system does not need the complex scoreboard or interlock hardware which is conventionally used to test the system registers for potential dependencies for some window of time after an operation begins execution. The complex scoreboard or interlock hardware otherwise required is sophisticated, high-speed checking hardware which must be capable of performing numerous dependency checks in a single clock cycle. The complex scoreboard or interlock hardware required is not only costly, but also a burden on the processor.

Although programs with user visible delay slots avoid the need for complex scoreboard or interlock hardware, such programs have a compatibility problem. A major disadvantage of programming with user visible delay slots is that the hardware latencies of the processing system must be known in order for the operations to be properly scheduled. As a result, a processing system which relies on user visible delay slots to prevent out-of-order execution will not be able to correctly execute programs created or compiled for a processing system having different hardware latencies.

Generally speaking, latency is defined as the number of clock cycles between the time an input operand is ready for use by a hardware function and the time that a resultant operand from that function is ready for use by a subsequent hardware function. An assumed latency is the number of cycles which the programmer assumes a processor (which is to execute the program) needs to calculate the result of an operation. A hardware latency is the actual latency of the processor. A processing system typically has a number of processors which have fixed hardware latencies associated with each processor or fixed hardware latencies associated with each operation.

An operation is a command encoded in a processor instruction stream which describes an action which the processor is required to complete. An operation cannot issue until the availability of necessary input operands can be guaranteed. Typically, the necessary inputs and outputs are specified by register names. Furthermore, an instruction is a collection of one or more operations which are assumed by a programmer to be issued within a single cycle.

As technology develops, processors become faster and more powerful. As a result, hardware latencies are always changing. A program which is created or compiled with user visible delay slots for execution by a specific processor will likely not execute properly on processors having different latencies, even if the processors are from the same family of processors. Thus, programming with user visible delay slots is not effective when the latencies of a processing system which executes the program differ from the latencies which were fixed in the program when created or compiled. Accordingly, the conventional uses of user visible delay slots fail to provide compatibility with processing systems having hardware latencies differing from those assumed in the program.

In any case, it is not commercially feasible to recompile a program every time a next generation processor, of a family of processors, is developed. For a number of reasons, vendors and users of programs want as few versions of a program as possible. One major reason is that every new recompile would have to be completely retested which would be not only very time consuming but also expensive. Another reason is that vendors do not want to inventory and support many different versions of a program.

FIG. 1 is a diagram illustrating a portion of a program which utilizes user visible delay slots which assume a fixed latency in a conventional manner. FIG. 1 is used to illustrate the compatibility problem associated with the prior art. In FIG. 1, assume that a program 2 was compiled for a first processor having a hardware latency of three cycles for the operation op2. Conventionally, when compiling source code or writing assembly language programs, delay slot(s) are preferably filled with meaningful operations which could not possibly be dependent on the result of the previous operation. However, if no such operation is available, then a no-operation (NOOP) may be placed in the delay slot. In the example shown in FIG. 1, two delay slots 4 were coded in the program between operation op2 and the use of its result (i.e., operation op3). In this example, the delay slots 4 contain operations (op) which do not depend on the result of operation op2. The denotations ra, rb, rc, rd and re refer to registers in the processing system.

Also assume that subsequently thereto, a second processor is developed having a hardware latency of four cycles for the operation op2. Although the program executes properly on the first processor, the program will likely not operate correctly on the second processor. In particular, when the second processor begins execution of operation op2 in cycle (0), the result cannot be guaranteed to be returned into register rc until cycle (4). However, in cycle (3), the subsequent operation op3, which is dependent on the value in register rc, begins execution. Accordingly, executing the program with the second processor would yield an incorrect result. As a result, programs using user visible delay slots and compiled for a specific processor cannot be guaranteed to execute properly on earlier or later processor generations.

A technique, however, does exist to provide at least some compatibility with different processing systems. The technique is utilized in the experimental Horizon supercomputing system which has a shared-memory Multiple Instruction Stream—Multiple Data (MIMD) stream computer architecture. The instruction set of the Horizon supercomputing system includes a lookahead field with every instruction. The lookahead field contains a value which is used to control instruction overlap. This value is guaranteed by the code generator to be less than or equal to the minimum distance to the next instruction that depends on the current instruction. That is, the value in the lookahead field indicates the number of additional instructions that may be issued before the current instruction is completed. A major disadvantage of the Horizon supercomputing system is that the code size of programs for this architecture are substantially increased due to the provision of the lookahead field with every instruction. For example, if the hardware latencies vary from one to eight cycles, then a three (3) bit lookahead field would be added to every instruction. Another disadvantage of the Horizon supercomputing system is that the value in the lookahead field applied to all three operations within the instruction, thereby forcing the value in the lookahead field to the worst case (smallest) value within the instruction. The experimental Horizon supercomputing system is more fully described in Kuehn and Smith, "The Horizon Supercomputing System: Architecture and Software," Supercomputing '88 (IEEE), November 1988; Draper, "Compiling on Horizon," Supercomputing '88 (IEEE), November 1988; and Thistle and Smith, "A Processor Architecture for Horizon," Supercomputing '88 (IEEE), November 1988.

Unrelated to software compatibility, a known supercomputer, Cydra™ 5 from Cydrome Incorporated, is able to adjust its memory access time. The Cydra™ 5 supercomputer is a heterogenous multiprocessor system having a single numeric processor and one to six interactive processors sharing a common virtual memory system. The supercomputer has a directed dataflow architecture which requires that the latency of every operation be known. The programmer uses a "virtual time" memory latency assumption which perceives each memory request as taking the same amount of time. However, in reality the data may be ready sooner or later than expected. If the access time expected by the compiler is consistently less than the actual access time, the processor spends a significant fraction of its time in a frozen or stalled state. If the expected access time is consistently greater than the actual access time, the length of the schedules generated at compile-time are unnecessarily dilated.

The Cydra™ 5 adjusts its nominal memory access time using a memory latency register which is a programmable register which contains the memory latency value that was assumed by the compiler when scheduling the currently executing code. The memory system uses the value in the memory latency register to decide whether the data from memory is early or late and, consequently, whether the data should be buffered or the processor stalled. If the result is tardy, the processor will stall execution of the subsequent instruction until the result is ready. The memory latency register is used to provide flexibility in a machine when the value or best value of memory latency is unknown and to improve performance only with respect to memory accesses. One problem with Cydra™ 5 is that if the memory latency register is changed to a larger value while there are some outstanding memory requests, the Cydra™ 5 may no longer execute properly. In any event, the Cydra™ 5 supercomputer did not solve the compatibility problem which has plagued those skilled in the art. The Cydra™ 5 supercomputer is more fully described in Rau et al., "The Cydra™ 5 Stride-insensitive Memory System," 1989 International Conference on Parallel Processing, 1989.

In sum, although programs designed with user visible delay slots avoid the need for complex dependency checking hardware, these programs have a definite lack of compatibility. As a result, programs designed with user visible delay slots for a specific processor are neither forward compatible to future processors nor backward compatible to earlier processors. Compatibility is extremely desirable because hardware latencies tend to change with each new processor implementation.

The present invention provides a unique solution to the compatibility problem of the prior art so that a single version of a program utilizing delay slots is compatible with a family of processors, regardless of whether hardware latencies of the processors are different.

SUMMARY OF THE INVENTION

Broadly speaking, the invention enables a program to execute properly in a processing system which has latencies which are different from those with which the program was created or compiled.

More particularly, according to the invention, a program to be executed notifies a processing system of the latency assumptions with which the program was created or compiled. The processing system utilizes the latency assumptions and actual hardware latencies of the processing system to determine whether the issuance of a subsequent instruction must be stalled to ensure that the latency assumptions of the program are not violated.

The present invention offers numerous advantages over the prior art, including the following. The present invention obtains software compatibility amongst a family of object code compatible processors. Software compatibility is achieved because the invention protects the precedence of operations within the program in accordance with the latency assumptions with which the program was coded. Moreover, the invention obtains software compatibility while only minimally increasing the text size of programs. The present invention also substantially reduces the need to perform costly and time consuming dependency checking operations associated with pipeline interlocks.

The invention includes two aspects. The first aspect of the invention concerns the efficient provision of latency information within a program having user visible latencies. In particular, a program includes latency assumptions using program code size efficient means. The latency assumptions are contained in the program by a programmer or compiler when scheduling the code. The second aspect of the invention concerns methods and apparatuses for executing a program in accordance with the latency assumptions contained within the program so as to ensure compatibility on object code compatible processing systems.

The first aspect may be implemented by various program code size efficient means. For example, the program code size efficient means could be latency information in the header of the program or latency setting statements within the body of the program.

According to a first embodiment of the second aspect, when the assumed latency for an operation is less than the actual hardware latency for a processor (e.g., function pipeline), the processing system stalls the issuance of subsequent operations for one or more cycles regardless of whether the subsequent instructions are dependent on previous, incomplete operations. This stall determination process is performed on an operation-by-operation basis for every operation which is "in-flight" in each of the processors of the processing system. This embodiment may be enhanced to avoid unnecessary stalls by tracking all stall requests by other processors to avoid unnecessary stalls.

According to a second embodiment of the second aspect, the first embodiment may be combined with scoreboard or interlock hardware to further reduce the number of unnecessary stalls. If the assumed latency for an operation is greater than or equal to the actual hardware latency, then no stalls are needed and no dependency checking (by the scoreboard or interlock hardware) need be performed. On the other hand, when the assumed latency is less than the hardware latency, the scoreboard or interlock hardware can be used to determine whether the next subsequent instruction is dependent on the result of a previous, incomplete operation. By making use of both latency assumptions and dependency checking, fast and accurate execution can be ensured. For example, normally a subsequent instruction which would issue after an earlier instruction by more cycles than the latency assumption but not more cycles than the hardware latency, would require stalling of the processor. However, if the dependency checking hardware determines that the next subsequent instruction is not dependent on a previous, incomplete operation, then the next subsequent instruction may be processed in due course (i.e., there is no need to stall the processors in the next cycle). On the other hand, if thenext subsequent instruction within this range is dependent on the result of a previous, incomplete operation, then the processing system must stall the issuance of the next subsequent instruction.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 2–10. However, those skilled in the art will readily appreciate that the detailed description given herein with respect to these figures is for explanatory purposes as the invention extends beyond these limited embodiments.

The invention is applicable to processing systems that process operations with latency greater than or equal to one. The processing system includes various processors which execute specific processing tasks. These processors are preferably function pipelines which utilize pipelining to execute operations. In any event, each of the processors (e.g., function pipelines) has its own hardware latency. More precisely, for each operation to be performed, the hardware latency depends on the hardware latency of the processing system.

As discussed in the background section, programs conventionally created or compiled with user visible delay slots are not usable on processing systems having different hardware latencies. The invention overcomes this problem in an efficient way so as to make programs compatible within a family of object code compatible processors.

The present invention includes two aspects. The first aspect concerns the efficient provision of latency information within a program using user visible delay slots. The second aspect concerns methods and apparatuses for executing a program in accordance with the latency information provided by the program so as to ensure compatibility on object code compatible processing systems.

Figure 2A:
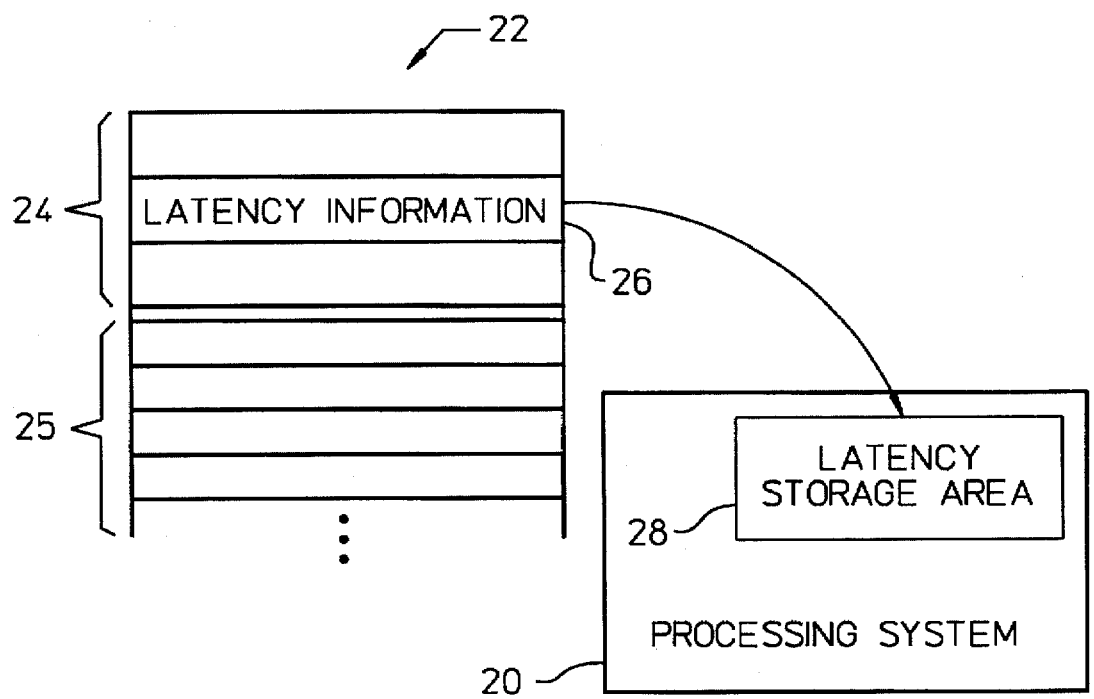
FIG. 2A is a diagram illustrating one technique by which a program can inform a processing system of the latency assumptions with which the program was coded in accordance with a first aspect of the invention.

The first aspect of the invention relates to the provision of latency assumption information within a program using text efficient means. FIG. 2A is a diagram illustrating one implementation of the text efficient means.

In general, the invention involves the interaction of a processing system 20 and a program 22 as illustrated in FIG. 2A. The program 22 includes a header portion 24 and a body portion 25. In FIG. 2A, latency information 26 (i.e., the latency assumptions which were used by the programmer or compiler when scheduling the code) is provided in the header portion 24 (i.e., outside the instruction stream). The latency assumptions for the operations within the program 22 can be stored to a latency storage area 28 within the processing system 20 during the start-up of the program 22. The latency assumptions can be arranged or coded in the header in a variety of different ways.

In any case, the text efficient means according to this implementation requires only a few bits of text in the header of a program. Thus, the first aspect of the invention enables the program 22 to notify the processing system 20 of the latency assumptions utilized by the program 22 while sacrificing only a very small number of bits.

Another implementation of the text efficient means includes latency setting statements within the program as operations. The latency setting statements would operate to set or change the latency assumptions for the various processing operations during program execution. Table 1 illustrates an example of a latency setting statement in a program. The latency setting statement set_LRA=4 sets a value of four in latency register A. Thereafter, when operation op4 is issued, the processing system will look to the latency register A (LRA) to obtain the appropriate latency assumption. In this case, the latency assumption indicates the latency with which the operation op4 (which is in the class of operations whose assumed latency is specified by LRA) was scheduled. Thus, the dependent operation op5 follows operation op4 by four cycles.

TABLE 1

| set_LRA=4 |
| ra=op4(rb,rc) |
| op |
| op |
| op |
| rd=op5(ra,rc) |

In the portion of the program shown in Table 1, the user visible delay slots contain operations (op) which never depend on the value in register ra. The notations ra, rb, rc and rd in Table 1 refer to registers in the processing system.

Latency setting statements are particularly advantageous if it is desirable to change latencies within a program. For example, a program may desire to change the latency assumptions during execution for performance reasons. The latency setting statements enable a programmer or compiler to change the assumed latency of any or all of the operations. At the same time, these changed latencies are provided to the processing hardware (e.g., latency storage area).

For example, it is beneficial to increase the latency of operations when entering a loop which is highly parallel. If the code is scheduled for latency of two but subsequently executed on a processor with latency of four, then the program will execute at almost optimized performance on both the latency two and four machines if the latency is increased to four upon entering a highly parallel loop and returned to two upon exiting the loop. The only performance loss to the latency two machine is two cycles when the loop is first entered. The performance gain to the latency four machine is dramatic because the execution is optimized, whereas if the code was scheduled at latency two, then the processors would stall two cycles every iteration of the loop. Thus, by raising the latency upon entering a highly parallel loop, the code will execute efficiently on machines with greater latency. If, on the other hand, the loop is not highly parallel, the latency should not be raised because raising the latency will only decrease performance in the latency two machine, while not improving the performance in the latency four machine.

Regardless of implementation, a text efficient means within the program 22 informs the processing system 20 of the latencies with which the program 22 was created or compiled while only minimally increasing the text size of the program 22.

Figure 2B:
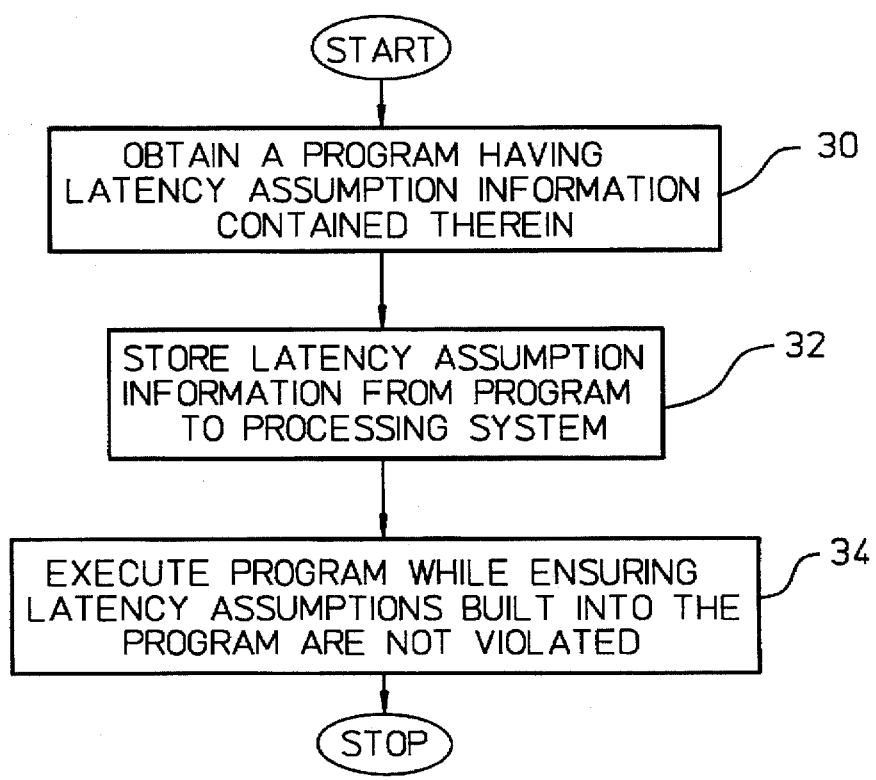
FIG. 2B is a flow chart illustrating the steps performed in executing a program in accordance with the invention.

FIG. 2B is a flow chart illustrating the steps performed in executing a program in accordance with the invention. FIG. 2B serves to link the first and second aspects of the invention together. First, a program having latency assumption information contained within the program is obtained 30 (first aspect). Next, the latency assumption information provided by the program is stored 32 in the latency storage area 28 of the processing system 20 for retrieval by the processing system 20 as needed. Third, the processing system 20 executes 34 the program 22 in accordance with the latency assumption information stored 30 in the latency storage area 28, thereby ensuring that the latency assumptions with which the program was created are not violated. The latency storage area 28 and the use of the latency assumptions by the processing system 20 are discussed in greater detail below with respect to the second aspect of the invention.

The second aspect of the invention concerns methods and apparatus for executing a program in accordance with the latency information provided by the program. Latency information is the latency assumptions by which the program was scheduled by a compiler or programmer. In general, the methods and apparatus receive the latency assumptions from the program in accordance with the first aspect, and then control the execution of the program in accordance with the second aspect so as to ensure compatibility in object code compatible processing systems.

The second aspect of the invention governs the preventative action taken by a processing system to ensure proper execution of a program. Specifically, the processing system determines whether it needs to stall the issuance of subsequent operations for one or more clock cycles. This determination is made based on an actual hardware latency of operations and an assumed latency of operations. The actual hardware latencies are hard wired into the processing system. The assumed latencies are provided to the processing system via the program itself (first aspect). The process for determining whether it is necessary to stall the issuance of subsequent operations for one or more cycles is described below (second aspect).

Figure 1:
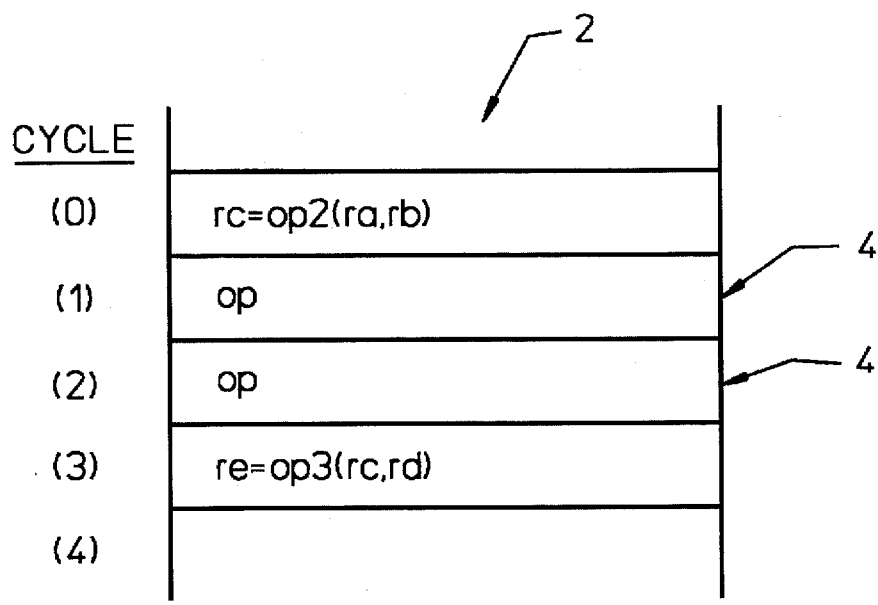
FIG. 1 is a diagram illustrating a portion of a program which utilizes user visible delay slots which assume a fixed latency in a conventional manner.
Figure 3:
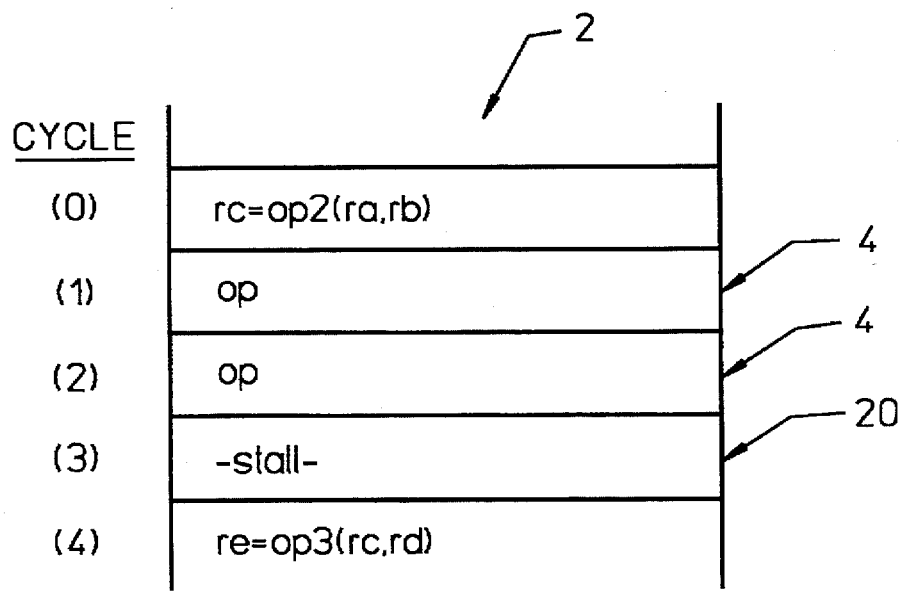
FIG. 3 is a diagram illustrating execution of the same portion of the program illustrated in FIG. 1 in a processing system having different latencies in accordance with the invention.

Before describing several embodiments of methods and apparatus according to the second aspect of the present invention, it may be helpful to briefly discuss an example of the effects which the second aspect has on program execution. FIG. 3 is a diagram illustrating a simplified example of the operation of the second aspect of the present invention. The program 2 illustrated in FIG. 3 is the same program 2 illustrated in FIG. 1 and includes user visible delay slots 4. The program 2 was created or compiled to run on processor A which has a latency of three cycles for operation op2 (see FIG. 1). In particular, when the program was scheduled, two delay slots 4 were encoded in the program between operations op2 and op3. These delay slots 4 contain operations (op) which are not dependent on the result on operation op2.

The program 2 will execute properly on processor A. However, unless preventive action is taken, the program 2 will not execute correctly on processor B (code compatible with processor A) which has a latency of four cycles for operation op2. The problem is that the program believes the result of operation op2 will be ready no later than cycle three (3), but in actually processor B cannot guarantee the result until cycle four (4).

The second aspect of the invention provides the necessary preventive action to ensure that the program will execute correctly on processor B. In particular, in this example, when the program 2 is executed in processor B which has a latency of four cycles for operation op2, a stall 20 will occur in cycle three (3) so as to shift the execution of operation op3 to cycle four (4). As a result, the program 2 will execute properly on processor B even though it was compiled to execute on processor A which has a different set of latencies. Although FIG. 3 illustrates the stall 20 as occurring in the third cycle following the operation op2, the stall 20 could also have occurred in cycles (1) or (2), or even completely avoided depending on the implementation of the second aspect of the invention.

Figure 4:
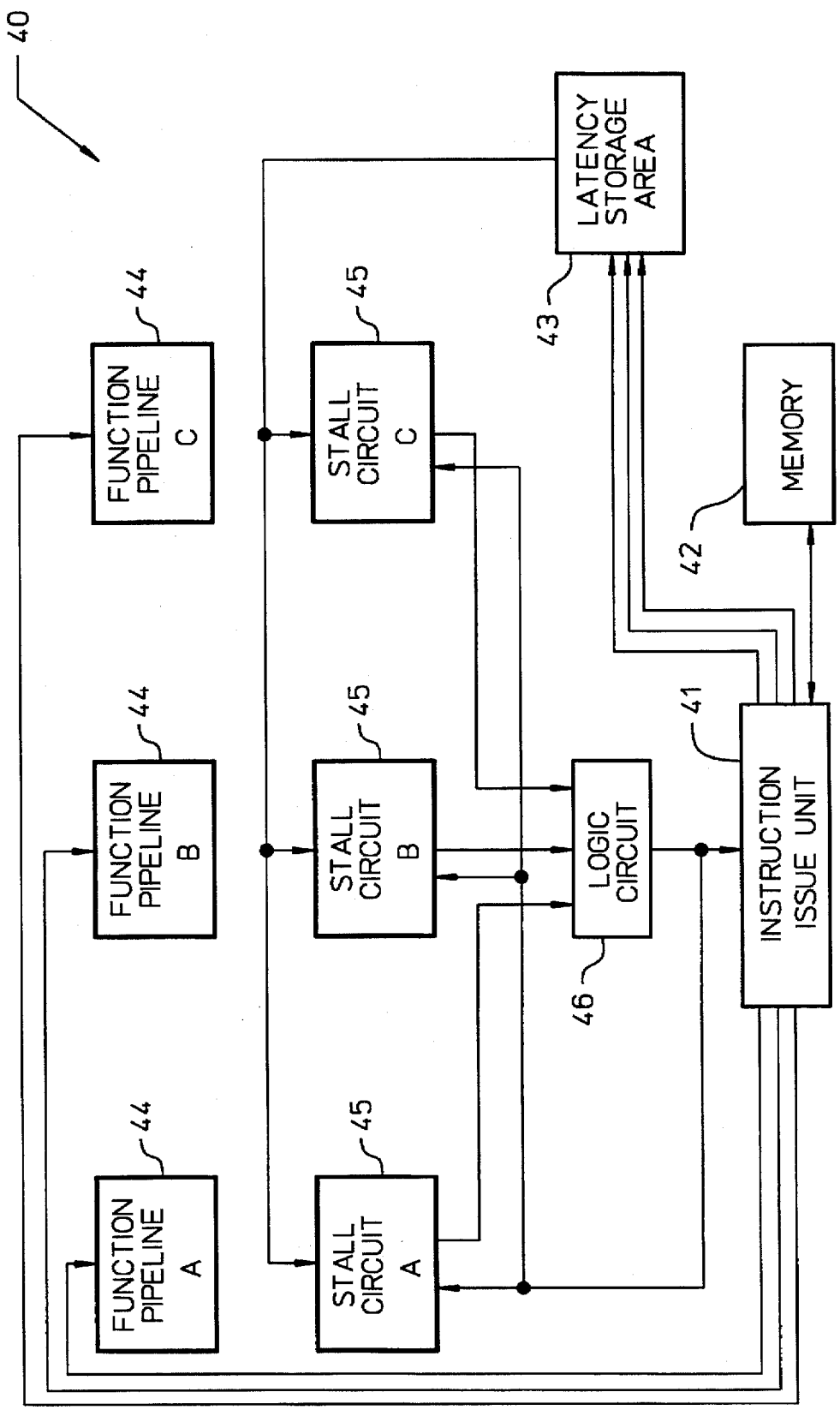
FIG. 4 is a block diagram illustrating an embodiment of a processing system in accordance with a second aspect of the invention.

FIG. 4 illustrates a block diagram of a processing system 40 according to the second aspect of the invention. The processing system 40 includes an instruction issue unit 41 for issuing instructions of a program. Each instruction includes one or more operations which may be simultaneously issued. The instruction issue unit 41 is connected to a memory 42 which contains the program to be executed. As each operation of the program is issued, the instruction issue unit 41 selects an appropriate latency assumption from a latency storage area 63. Prior to retrieving the latency assumptions, the processing system 40, in conjunction the first aspect of the invention, places the latency assumptions in the latency storage area 43. The latency storage area 43 is simply a storage area (e.g., register, memory location, etc.) accessible to the instruction issue unit 41.

The instruction issue unit 41 is also connected to processors consisting of function pipelines 44. The function pipelines 44 illustrated in FIG. 4 are function pipeline A, function pipeline B and function pipeline C. Each of the function pipelines 44 is typically configured for different tasks. For example, function pipeline A may be for memory (load/store) operations, function pipeline B may be integer operations, and function pipeline C may be for floating-point operations.

Further, the processing system 40 includes stall circuits 45 and a logic circuit 46. Each stall circuit 45 is associated with one of the function pipelines 44. Hence, each processor of the processing system 40 could be viewed as including both a function pipeline 44 and a stall circuit 45. The stall circuits 45 illustrated in FIG. 4 are stall circuit A, stall circuit B and stall circuit C. Each stall circuit determines whether a stall is required by the processing system 40 to prevent violating the latency assumptions of the program. Outputs from each of the stall circuits 45 are sent to the logic circuit 46 which sends a stall signal to the instruction issue unit 41. The stall signal is also fed back to each of the stall circuits 45. Preferably, the logic circuit 66 is an OR circuit.

The stall circuits 45 receive the latency assumptions from the latency storage area 43. The actual pipeline latency of each of the function pipeline 44 is know by the stall circuit 65 associated therewith (e.g., hard-wired into the circuit). The function of the stall circuits 45 is to determine if stalls are needed to ensure correct operation of the program by the processing system 40. Specifically, the stall circuits 45, together with the issue instruction unit 41, cause the issuance of further instructions to stall as necessary to ensure proper execution of the program.

Figure 5:
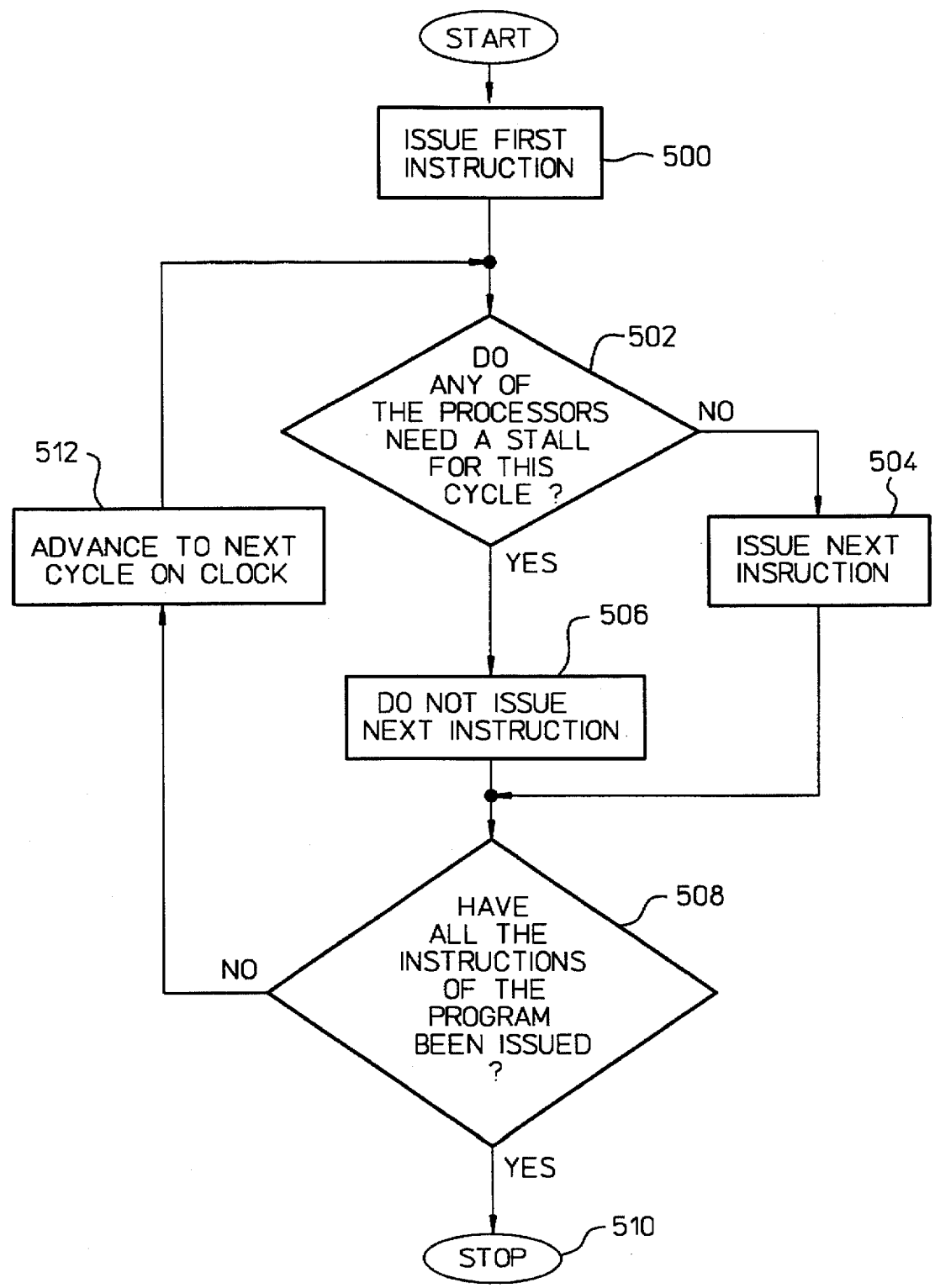
FIG. 5 is a flow chart of the issue/stall processing performed by the processing system.

FIG. 5 is a flow chart illustrating the steps performed by the instruction issue unit 41 of the processing system 40 illustrated in FIG. 4 (issue/stall processing). For each cycle of program execution, the processing system functions to control whether to issue or to .stall the issuance of the next instruction of the program. Each instruction may include one or more operations. An instruction with multiple operations has built in overlap, but each operation within the instruction is executed by a different processor (e.g., function pipeline).

In FIG. 5, the processing begins by issuing 500 a first instruction of the program. As each instruction is issued 500, the operations within the instruction are forwarded to the processor (e.g., function pipeline 44) which executes operations of this type. For example, an integer add operation would be sent to an integer arithmetic-logic-unit (ALU) pipeline. Alternatively, a load or store operation would be sent to a memory pipeline.

Next, a decision 502 is made based on whether any of the processors (e.g., stall circuits 45) of the processing system 40 assert a stall for this cycle. More particularly, the decision 502 is made based on whether any of the stall circuits 45 associated with the function pipelines 44 assert a stall for this cycle. The generation of the stall assertions is described below with reference to FIGS. 6 and 7.

If none of the processors (e.g., stall circuits 45) assert a stall for a given cycle, then the next subsequent instruction in the program is issued 504, thereby forwarding one or more operations to the appropriate function pipelines 44. Alternatively, if one or more of the processors (e.g., stall circuits 45) assert a stall for a given cycle, then the issuance of the next subsequent instruction is stalled 506 for one cycle. In either case, following blocks 504 and 506, the system makes a decision 508 based on whether all the instructions of the program have been issued. If all the operations of the program have been issued, then the issue/stall processing is complete and the processing stops 510. On the other hand, if all the operations have not yet issued, then the issue/stall processing continues by looping back to block 502. However, before returning to block 502, a synchronization delay is incurred so that the processing advances 512 to block 502 only on next clock cycle.

Figure 6:
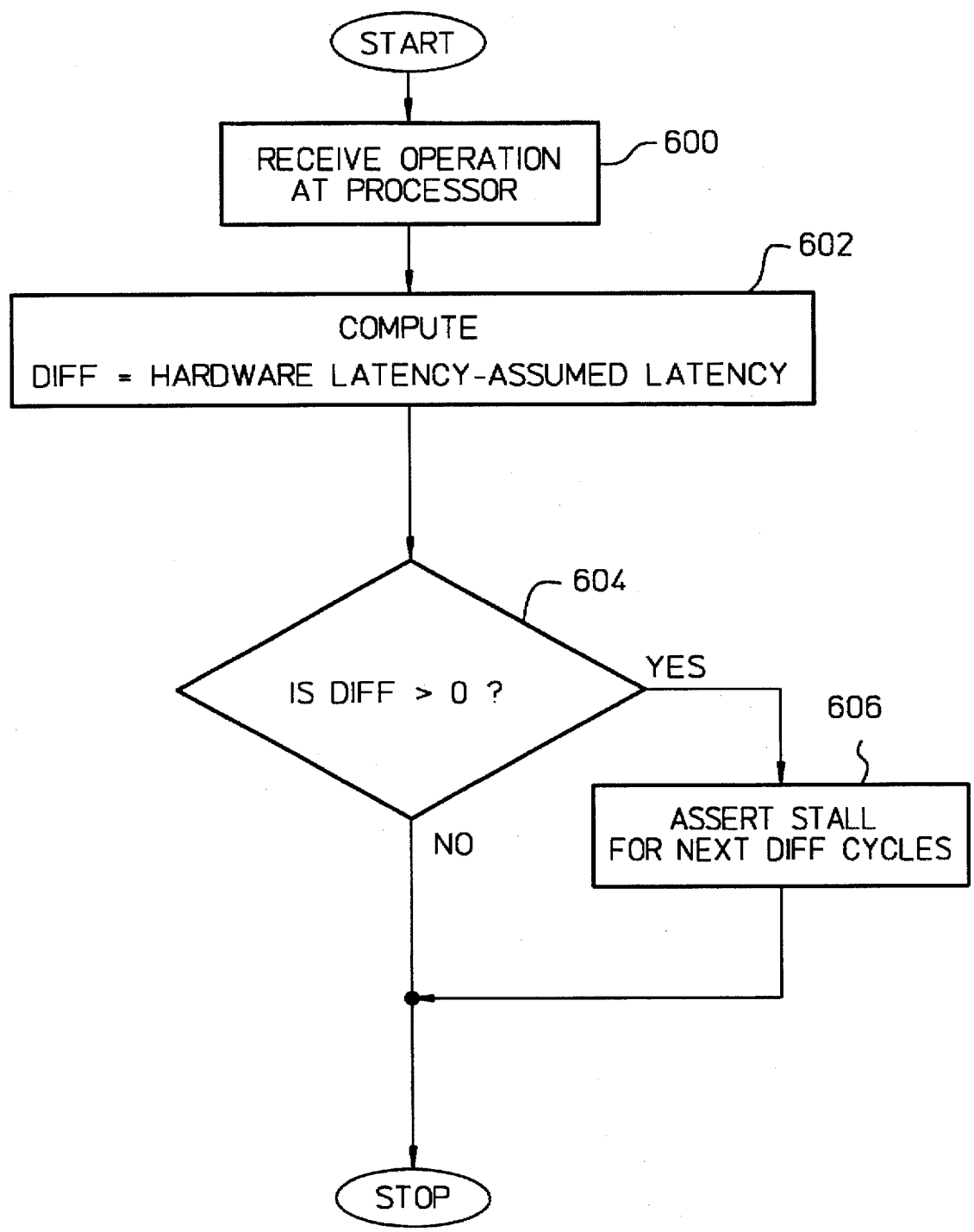
FIG. 6 is a flow chart illustrating a first embodiment of the stall determination processing performed by the processing system for each operation.

FIG. 6 is a flow chart illustrating a first embodiment of the processing steps performed by the processors for each operation (stall determination processing). As each instruction is issued (FIG. 5), the operation(s) included therein are forwarded to their respective processor. Each operation which has been issued, is received 600 at one of the processors. Next, a difference value (DIFF) is computed 602 by subtracting the assumed latency for the operation from the hardware latency of the operation by the processor. The assumed latency is available to the processing system via the program (first aspect), and the hardware latency in known by the processing system.

A decision 604 is then made based on the difference value (DIFF). If the difference value (DIFF) is greater than zero, then the processor asserts 606 a stall for the next DIFF cycles. On the other hand, if the difference value (DIFF) is less than or equal to zero, then no stalls are necessary to process the operation in question. Following blocks 604 and 606, the stall determination processing is completed.

Figure 7:
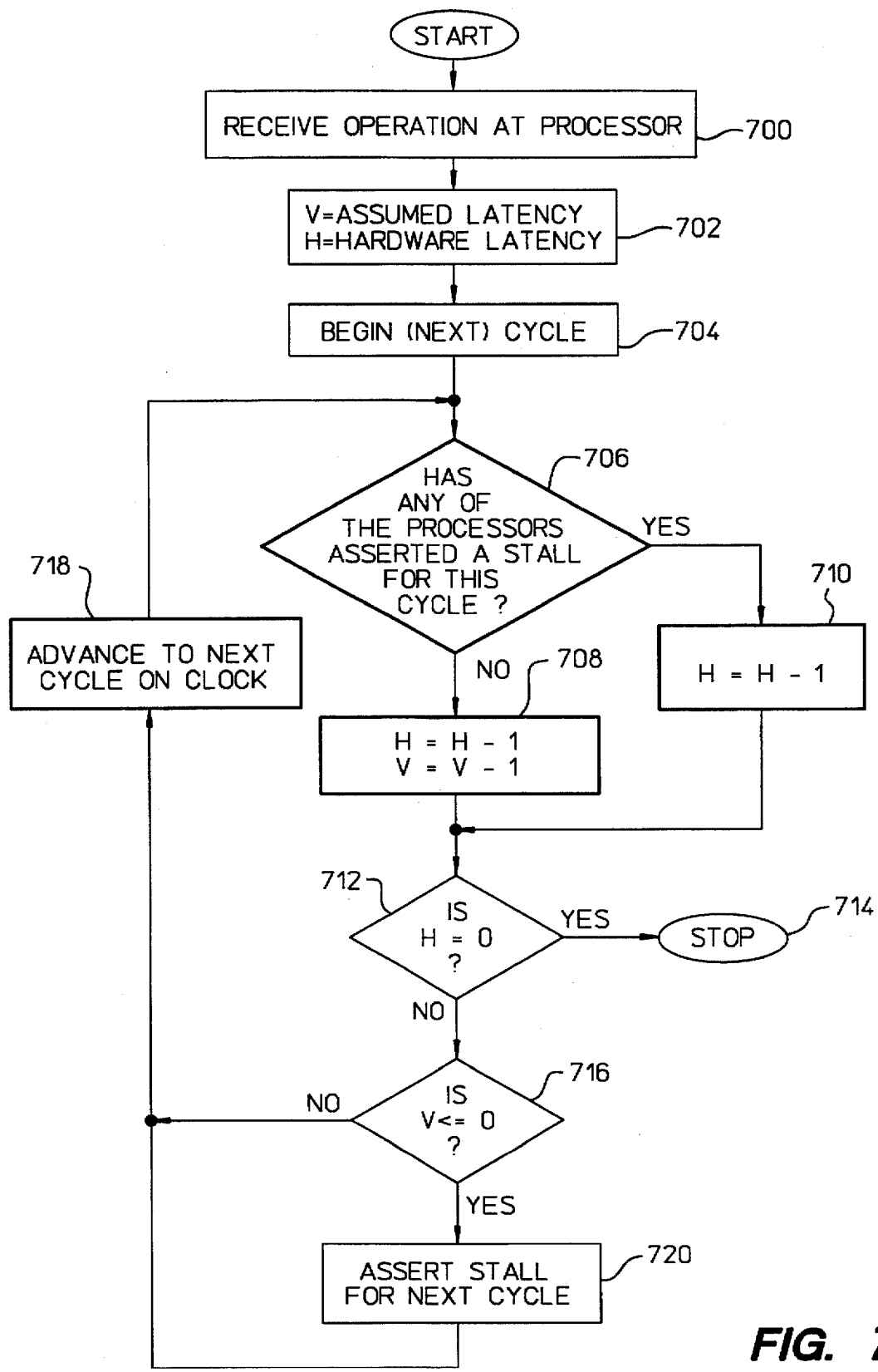
FIG. 7 is a flow chart illustrating a second embodiment of stall determination processing performed by the processing system for each operation.

FIG. 7 is a flow chart illustrating a second embodiment of the processing steps performed by the processors for each operation (stall determination processing). As an example, as shown in FIG. 4, each processor may include at least a stall circuit 45 and a function pipeline 44. For every cycle each operation is "in flight" in a function pipeline 44, the processing system 40 will determine whether to issue the next instruction or to stall for a cycle. The processing steps performed for each "in-flight" operation are illustrated in FIG. 7 and described below with reference to FIG. 4.

Initially, an operation is received 700 for processing at a function pipeline 44. The operation received 700 is an operation which has been issued (FIG. 5, blocks 500, 504) by the instruction issue unit 41. For every "in-flight" operation, the processing system 40 monitors the latency assumption for the operation and the hardware latency of the function pipeline 44 which performs the operation. Next, variables V and H are respectively assigned 702 the values of the assumed latency of the operation and the hardware latency of the function pipeline 44. The assumed latency is the latency assumption for the particular operation which has been retrieved from the program and stored in the processing system 40 (e.g., latency storage area 43).

The monitoring of the latencies is performed every cycle in which the operation is "in-flight." Block 704 indicates when the next cycle begins. Initially, the next cycle through block 704 is the first cycle of the operation which is received 700. In subsequent iterations of the processing loop shown in FIG. 7, the next cycle through block 704 is a subsequent cycle of the operation. During these clock cycles the function pipeline 44 is processing the operation.

A decision 706 is then made based on whether any of the processors assert a stall for this cycle. With respect to FIG. 4, the stall circuits 45 assert a stall if their related function pipeline 44 needs to stall. If none of the processors assert a stall for the cycle, then the values of the variables H and V are both decreased 708 by one. In this case, no stall occurs (i.e., block 504, not block 506, will be performed in FIG. 5). On the other hand, if one or more of the processors (e.g., stall circuit 45) assert a stall for the cycle, then only the value of the variable H is decreased 710 by one. In this case, a stall occurs in this cycle (i.e., block 506, not block 504, will be performed in FIG. 5).

Subsequent to blocks 708 or 710, a decision 712 is made based on the value of the variable H. If the value of the variable H equals zero, the processor has completed its processing of the operation (i.e., the operation is no longer "in-flight") and the stall determination processing may cease 714. On the other hand, when the value of the variable H is greater than zero, a decision 716 is made based on the value of the variable V. If the value of the variable V is greater than zero, then the stall determination processing loops back to block 704 to process the next cycle. A loop back at this point represents the situation in which a stall is not asserted for this operation in this cycle because the operation is still within the function pipeline 44 and stalls asserted (if any) by other processors may still make up the difference in latency before a stall would be asserted by this processor for a particular operation. The subsequent processing is, however, delayed so that it is advanced 718 to the next cycle synchronized with a clock signal. Alternatively, if the value of the variable V is less than or equal to zero, a stall is asserted 720 for the next cycle. A loop back at this point represents the situation in which a stall is asserted this cycle because the operation is still within the function pipeline 44, the latency assumption is less than the hardware latency, and stalls requested by other processors (during a latency assumption period) have not made up the difference in latency. After block 720, the processing loops back to block 704 via block 718.

In general, stall assertions are issued when the assumed latency is less than the actual hardware latency. These stall assertions operate to protect the precedence of the program operations. The first embodiment of the stall determination process illustrated in FIG. 6 simply stalls up front the amount of cycles by which the hardware latency exceeded the assumed latency. In contrast, the second embodiment of the stall determination process illustrated in FIG. 7 is more efficient. According to the second embodiment, the invention may track the stall assertions of all the other latency monitoring processes being simultaneously performed for each of the "in-flight" operations in each of the processors. Namely, if one function pipeline 44 causes the instruction issue unit 41 to stall for a certain cycle, then all the function pipelines 44 adjust their stall determining processing as if they induced the stall. Moreover, this approach can also compensate for stalls which occur due to other reasons. For example, a memory pipeline may assert a stall if a cache miss has occurred.

Figure 8:
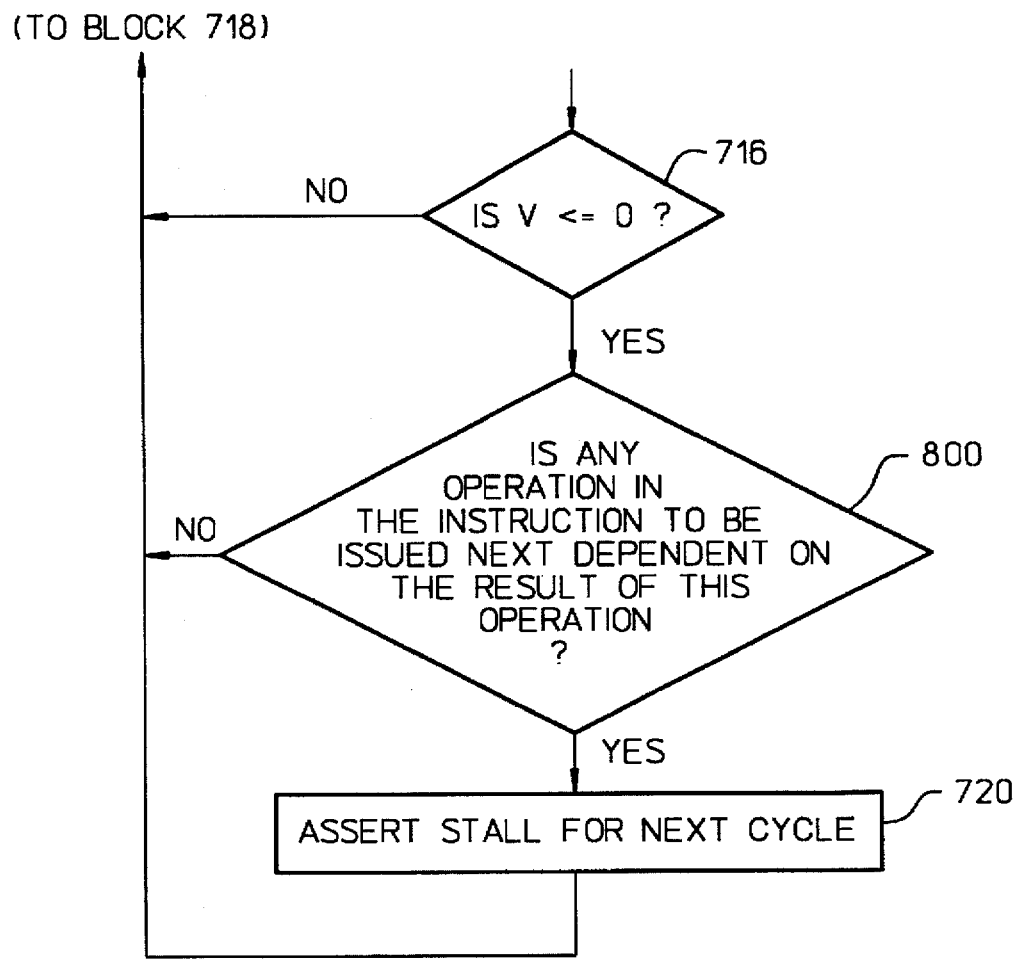
FIG. 8 is a partial flow chart illustrating an optional modification of the second embodiment of the stall determination processing illustrated in FIG. 7.

FIG. 8 illustrates an optional modification of the second embodiment of the stall determination processing illustrated in FIG. 7. The resulting modified embodiment has potentially greater processing speed, but requires selective dependency checking with scoreboard or interlock hardware. However, the scoreboard or interlock hardware required is greatly simplified as compared to that conventionally required. In particular, if block 716 (FIG. 7) determines the value of the variable V to be less than or equal to zero, then a decision 800 is made using the scoreboard or interlock hardware. This hardware is only required to determine whether any operation in the instruction to be issued next is dependent on the result of a previous, incomplete ("in-flight") operation being monitored by this processing. If not, the processing proceeds to block 718 and thereby avoids stalling the issuance of the next instruction. On the other hand, if the next operation is dependent on the result of a previous, incomplete operation, then a stall is asserted 720 for the next cycle as was the case in FIG. 7. The major advantage of this modified embodiment is that the dependency checking need not occur until the number of processing cycles exceed the latency assumption for the operation (i.e., (V≦0). As a result, the dependency checking hardware is simplified and used only as needed.

Figure 10:
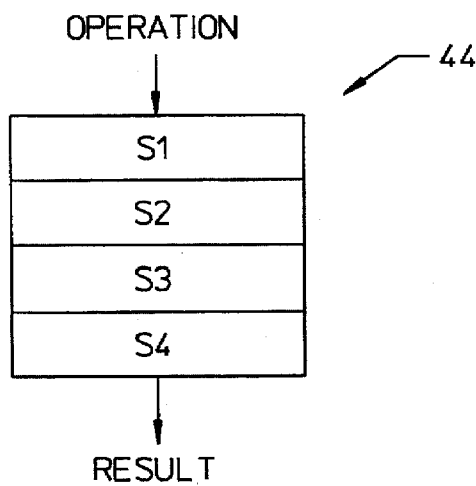
FIG. 10 is a block diagram of a function pipeline.
Figure 9:
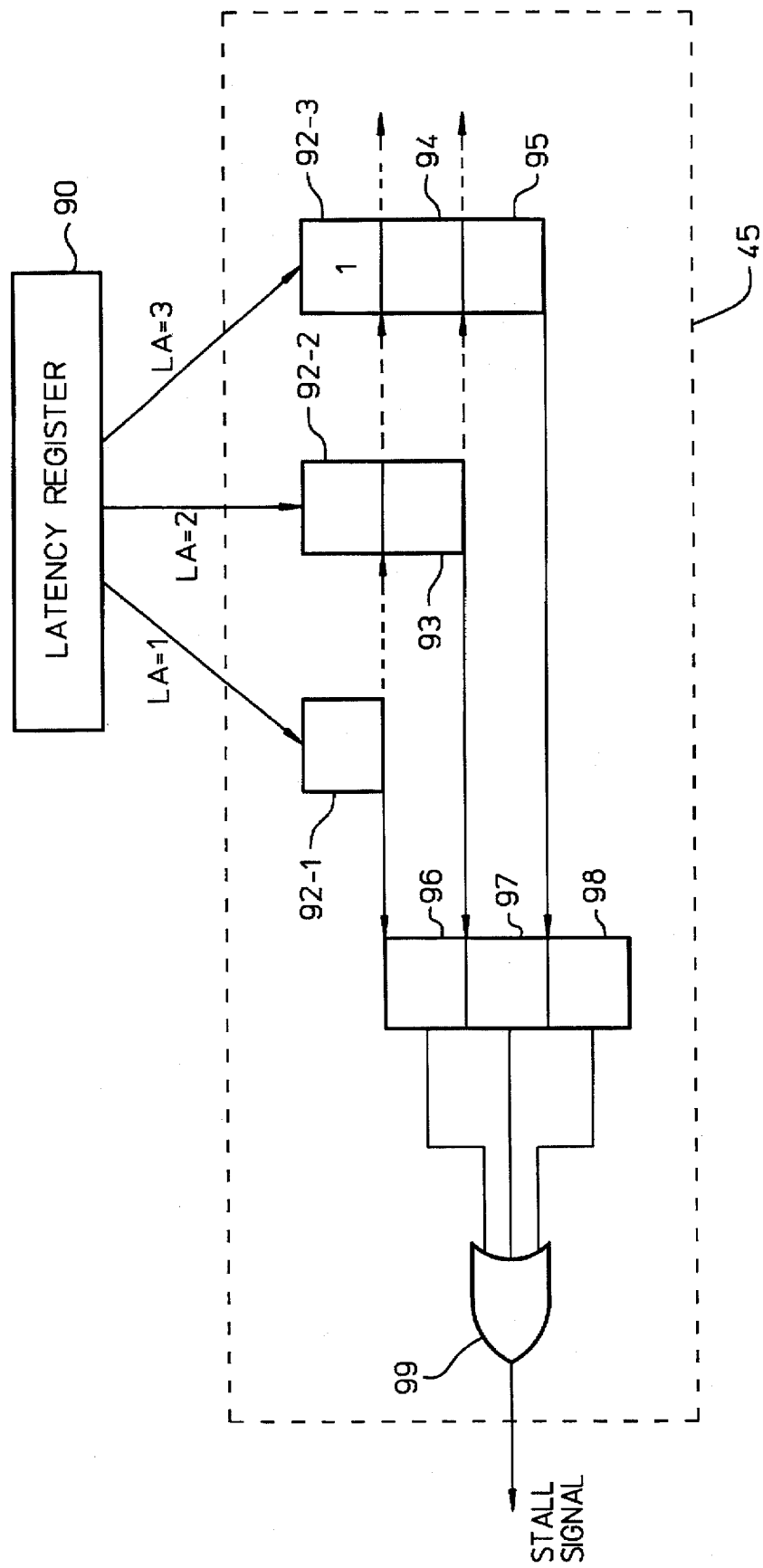
FIG. 9 is a schematic diagram illustrating a hardware implementation of a stall circuit.

FIG. 9 is a schematic diagram of a hardware implementation of the stall circuit 45 shown in FIG. 4, and FIG. 10 is a schematic diagram of a function pipeline 44. FIG. 9 also illustrates the operation of the stall circuit 45 in conjunction with the operation of the function pipeline 44. The function pipeline 44 shown in FIG. 10 has four stages S1, S2, S3 and S4. Hence, the actual hardware latency of the function pipeline 44 is four cycles. Each of these stages performs a portion of the execution of the operation being processed. The operation steps through the stages of the function pipeline 44 in real time, regardless of latencies. On the other hand, the issuance of subsequent instructions is performed in virtual time. Namely, if a stall is asserted by one of the stall circuits 45, the next subsequent instruction is not issued next cycle. In this case, virtual time stops, but real time continues.

The hardware implementation of the stall circuit 45 shown in FIG. 9 includes a number of registers 90–98 and an OR circuit 99. The latency register 90 receives and stores the latency assumption for the operation issued to the function pipeline 44. As an example, the latency register 90 represents a part of the latency storage area 43 (FIG. 5). The latency assumption (LA) is distributed to one of the registers 92 each time an operation is issued on this function pipeline 44. If the latency assumption equals one (LA=1), then bit register 92-1 receives a "1" bit and bit registers 92-2 and 92-3 receive "0" bits. If the latency assumption equals two (LA=2), then bit register 92-2 receives a "1" bit and bit registers 92-1 and 92-3 receive "0" bits. If the latency assumption equals three (LA=3), then bit register 92-3 receives a "1" bit and bit registers 92-1 and 92-2 receive "0" bits. If the latency assumption is at least four (LA≧4), then all of the registers 92 receives a "0" bit because no stalls are necessary.

The operation of the stall circuit illustrated in FIG. 9 is discussed below assuming the latency assumption of the operation just issued is three. When the operation enters stage S1 of the function pipeline 44, a "1" bit is in register 92-3. At the next cycle, the operation progresses to stage S2 in the function pipeline 44 and the "1" bit drops down from bit register 92-3 to bit register 94. In the third cycle, the operation progresses to stage S3 and the "1" bit again drops down to bit register 95. In the fourth cycle, the operation progresses to the final stage S4 of the function pipeline 44 and the "1" bit is shifted down and to the left to bit register 98. A "1" bit in any of bit registers 96–98 causes the OR circuit 99 to issue a stall assertion (request) which prevents the subsequent instruction (which follows the operation in stage S4 by four operations) from issuing for one cycle. Once the fourth cycle has completed, the result of the operation is available from the function pipeline 44 for use by any subsequent instructions. Since the actual pipeline latency is four cycles and the latency assumption was three cycles, only one stall was needed. If, however, the latency assumption was one cycle, then three stall cycles would be needed (i.e., bit registers 96, 97, 98).

The stall circuit 45 operates differently when a stall is initiated by another one of the stall circuits 45. For example, again assume the latency assumption is three, if a stall is initiated by another stall circuit 45 for cycle two, the "1" bit shifts down and to the right from bit register 94 to beyond the stall circuit 45. That is, the "1" bit is shifted out of the bit registers. Thus, if a stall cycle occurs within a latency assumption window, then the "1" bit shifts down and to the right (along dotted lines) so as to decrease the number of stalls which the stall circuit 45 might assert. The latency window is the period of time (in cycles) from issuance of an operation to a processor until the number of elapsed cycles equals the latency assumption for the operation.

The above discussion has assumed implementation of the invention in a "less than or equal to" machine. These machines assume than an operation will take its full latency to produce a result but do not guarantee that the result will not be returned early. For example, if an operation has a latency of three cycles, a "less than or equal to" machine could return the result instantaneously or up to three cycles after the operation issues. Even so, those skilled in the art will readily recognize that the invention is equally applicable to an "equals" machine. An "equals" machine guarantees that the result of an operation will be returned exactly at the latency. Hence, generally speaking the modifications required might include some additional hardware to buffer the data at the pipelines and then returning it at exactly its latency.

The basic operations of the second aspect of the invention are as follows. When the actual hardware latency for an operation is less than or equal to the assumed latency with which the program was coded, the execution of the program will produce a correct result. However, on the other hand, if the assumed latency is less than the actual hardware latency, the present invention insures that the program executes in accordance with the latency assumption with which the program was scheduled.

In summary, the present invention insures proper execution of a program even when the actual hardware latencies of the processing system differ from the hardware latencies with which the program was created. Thus, a program using user visible delay slots is able to operate correctly in code compatible processing systems regardless of actual hardware latencies.

The many features and advantages of the present invention are apparent from the written description and thus it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for operating a computer system such that the computer system is capable of correctly executing programs having latency assumptions that are different than the latencies of the computer system, comprising the steps of:

(a) loading into a computer system a computer program having instructions and latency assumptions with which the computer program was created, said computer system having hardware latencies;

(b) storing the latency assumptions from the computer program to a latency storage area; and (c) executing the instructions of the computer program, wherein when executing said instructions each instruction in said program is executed following execution of any previously executed instructions, and while executing said instructions ensuring that the latency assumptions are not violated by the processing system by comparing the latency assumptions with which the computer program was created with the hardware latencies of the computer system and by stalling a step executing the instructions prior to satisfying the latency assumption of said any previously executed instructions, thereby correctly executing the computer program regardless of hardware latencies of said computer system.

2. A method as recited in claim 1, wherein the instructions of the computer program include at least one operation, and wherein said executing step (c) comprises the steps of:

(c1) periodically issuing instructions of the computer program to one of a plurality of processors within the processing system; and (c2) temporarily stalling said issuing step (c1) when the latency assumption for a particular one of the operations being executed is less than a hardware latency of the processor which executes the particular operation.

3. A method as recited in claim 2, wherein the hardware latency is variable.

4. A method as recited in claim 1, wherein the instructions of the computer program include at lead one operation, and the processing system includes at least a plurality of processors for processing the operations.

5. A method as recited in claim 4, wherein each of the processors has a hardware latency, and wherein said executing step (c) comprises the steps of:

(c1) issuing instructions of the computer program;

(c2) monitoring whether any of the processors assert a stall within a latency assumption window associated with an operation; and (c3) stall said issuing step (c1) when stalls asserted during the latency assumption window by the other processors for other operations do not make up the difference between the hardware latency and the latency assumption for the particular operation being processed.

6. A method for executing a program in a processing system, the program including at least instructions and latency information with which the program was created, the processing system including at least a plurality of processors and dependency checking hardware, said method comprising the steps of:

(a) issuing from an instruction issue unit instructions of the program, each instruction including at least one operation, and each instruction, except the last instruction of the program, being followed by a next instruction being issued from said instruction issue unit;

(b) for each operation, processing the operation of the program in one of said processors;

(c) for each operation, obtaining dependency information by directing the dependency checking hardware to determine if any operation of the next instruction is dependent on the result of the operation; and (d) when executing said issuing step (a) for said next instruction, stalling said issuing step (a) based on the latency information with which the program was created for the operations being processed in step (b) if the dependency information obtained in step (c) indicates that the next instruction is dependent on the result of the operation.

7. A method as recited in claim 6, wherein the program has latency assumptions for said plurality of processors and said method further comprises the step of postponing any stalling for a processor of said plurality of processors until the latency assumption for said processor has expired.

8. An article of manufacture comprising a computer readable storage medium tangibly embodying a program code means readable by a computer to control the operation of the computer to execute instructions, the program code means comprising:

header portion code means containing non-executable instructions including latency assumptions with which the program code means was created about processors in the computer; and body portion code means containing executable instructions comparing said latency assumptions with which the program code means was created with hardware latencies of the processors in the computer and stalling a step in executing the instructions prior to satisfying the latency assumption of said any previously executed instructions, thereby ensuring correct timing in executing the computer program regardless of hardware latencies of said computer system.

9. An article of manufacture comprising a computer readable storage medium tangibly embodying a program code means readable by a computer to control the operation of the computer to execute instructions, the program code means comprising:

a computer program having a plurality of instructions to be executed by a processing system, said computer program having a header portion code means containing non-executable instructions including latency assumptions with which the program code means was created, about processors in the computer; and body portion code means containing executable instructions, including executable latency setting statements placed in said body portion of said computer program at locations executed prior to instructions making use of such latency assumptions, said latency setting statements being capable of changing the latency assumptions, whereby a computer executing said computer executable instructions compares said latency assumptions with which the program code means was created to hardware latencies of the processors and stalling a step in executing the instructions prior to satisfying the latency assumption of said any previously executed instructions, thereby ensuring correct timing in executing the computer program regardless of hardware latencies of said computer system.

10. An article of manufacture comprising a computer readable storage medium as recited in claim 8, wherein said body portion further comprises instructions for postponing such refraining of execution until the latency assumption has expired.

11. A processing system for executing a computer program, the computer program including instructions and latency assumption information indicating assumed latencies with which the computer program was created, comprising:

an instruction issue unit for issuing the instructions of the computer program, each of the instructions including at least one operation;

a latency storage area connected to said instruction issue unit for receiving and storing the latency assumption information from the computer program;

one or more processors connected to said instruction issue unit for processing the instructions of the computer program, each of the processors has hardware latency; and stall determination means for stalling the issuance of the instructions by said instruction issue unit for a cycle based on comparing the latency assumption with which the computer program was created with the hardware latency for a processor of said processors for each of the operations being processed;

wherein for each instruction in said computer program, said issue unit issues the instruction to a subset of said processors.

12. A processing system as recited in claim 11, wherein at least one of said processors is a function pipeline.

13. A processing system as recited in claim 11, wherein each processor has a particular hardware latency for operations executed by said processor, and wherein said stall determination means determines, for each operation being processed, whether the issuance of subsequent instructions should be stalled based on both the latency assumption for the operation being processed and the hardware latency of said processor processing the operation.

14. A processing system as recited in claim 13, wherein the hardware latency is variable.

15. A processing system as recited in claim 13, wherein said stall determination means comprises, for each operation being processed, means for postponing the stalling of the issuance of the instructions for a number of cycles equal to the latency assumption for the respective operation.

16. A processing system as recited in claim 13, wherein said stall determination means further comprises means for monitoring whether any of the other operations assert a stall.

17. A processing system as recited in claim 13, wherein said stall determination means further comprises means for stalling of the issuance of an instruction for a clock cycle when the latency assumption for an operation is less than the hardware latency, when the number of clock cycles equal to the latency assumption for the operation have passed since beginning execution of the operation, and when stall requests requested by the other operations have not made up the difference between the hardware latency and the assumed latency.

18. A processing system as recited in claim 11, wherein said processing system further comprises a dependency checking unit for determining, for each operation, whether subsequent instructions of said computer program are dependent on results of the operation currently being processed and operable to produce dependency information.

19. A processing system as recited in claim 18, wherein said stall determination means stalls the issuance of subsequent instructions of said computer program based on both the latency assumption for the operation being processed and the dependency information produced by said dependency checking unit.

20. A processing system for executing operations of a program, said processing system comprising:

at least one function pipeline, each function pipeline having a number of stages and an actual pipeline latency;

a memory area for storing the program, the program including at least the operations and latency assumption information with which the program was created;

a latency storage area for storing at least one latency assumption for said function pipeline in accordance with the latency assumption information;

at least one stall circuit, operatively connected to said function pipeline, for determining whether said function pipeline corresponding thereto needs a stall to ensure proper execution and produces a stall signal if a stall is needed;

a control unit, operatively connected to said function pipeline, said memory area and said latency storage area, for obtaining the latency assumption information from the program and storing the at least one latency assumption for said function pipeline in said latency storage area, for issuing the operations of the program to be executed concurrently in said function pipeline, and for stalling the issuance of the operations when the stall signal requests a stall.

21. A processing system as recited in claim 20, wherein said processing system comprises a plurality of function pipelines and a plurality of stall circuits, each of said stall circuits corresponding to one of said function pipelines, and each of said stall circuits determines whether said function pipeline corresponding thereto needs a stall to ensure proper execution and produces a stall signal if a stall is needed, wherein said processing system further comprises a logic circuit, operatively connected to said stall circuits, for receiving the stall signals from each of said stall circuits and producing a stall control signal, and wherein said control unit stalls the issuance of the operations when the stall control signal requests a stall.

* * * * *